United States Patent
Brzeski et al.

(10) Patent No.: US 12,482,101 B2
(45) Date of Patent: Nov. 25, 2025

(54) PATHOLOGICAL ANOMALY DETECTION IN DICOM IMAGES AND GENERATION OF A SUMMARY IMAGE

(71) Applicant: BrainScan S.A., Gdansk (PL)

(72) Inventors: Adam Brzeski, Gdansk (PL); Jan Cychnerski, Gdansk (PL); Szymon Korzekwa, Radzionkow (PL); Marek Trojanowicz, Gdansk (PL); Mateusz Marmolowski, Gdansk (PL)

(73) Assignee: BrainScan S.A., Gdansk (PL)

( * ) Notice: Subject to any disclaimer, the term of this patent is extended or adjusted under 35 U.S.C. 154(b) by 0 days.

(21) Appl. No.: 18/743,666

(22) Filed: Jun. 14, 2024

(65) Prior Publication Data
US 2025/0272830 A1    Aug. 28, 2025

Related U.S. Application Data

(60) Provisional application No. 63/558,425, filed on Feb. 27, 2024.

(51) Int. Cl.
| | | |
|---|---|---|
| *G09G 5/00* | (2006.01) | |
| *G06T 7/00* | (2017.01) | |
| *G06T 11/60* | (2006.01) | |
| *G16H 30/20* | (2018.01) | |

(52) U.S. Cl.
CPC ............ *G06T 7/0012* (2013.01); *G06T 11/60* (2013.01); *G16H 30/20* (2018.01); *G06T 2207/10081* (2013.01); *G06T 2207/30004* (2013.01)

(58) Field of Classification Search
CPC ......... G06T 11/60; G06T 19/00; G06T 11/00; G06T 11/20; G06T 11/206; G06T 7/0012; G06T 2207/10081; G06T 2207/30004; G06F 9/4443; G06F 3/0481; G06F 30/13; G06F 3/04845; G06F 3/04883; G06F 40/143; G06F 16/54; G06F 16/56; G06F 16/5838; G06V 20/20; G11B 27/10; H04N 21/47217; G16H 30/20
USPC .......................................................... 345/619
See application file for complete search history.

(56) References Cited

U.S. PATENT DOCUMENTS

| | | | | |
|---|---|---|---|---|
| 2014/0343425 | A1* | 11/2014 | Ihnatsenka | A61B 8/4254 600/443 |
| 2017/0091582 | A1* | 3/2017 | Takata | G16H 30/20 |
| 2017/0123397 | A1* | 5/2017 | Billi | G05B 19/048 |
| 2018/0033144 | A1* | 2/2018 | Risman | G06T 7/0014 |
| 2021/0369394 | A1* | 12/2021 | Braido | A61B 34/76 |
| 2022/0092772 | A1* | 3/2022 | Yuh | A61B 6/032 |
| 2022/0225945 | A1* | 7/2022 | Eletr | A61B 5/318 |
| 2024/0103948 | A1* | 3/2024 | Manohar | G06F 11/0793 |

\* cited by examiner

*Primary Examiner* — Gordon G Liu
(74) *Attorney, Agent, or Firm* — Cognition IP, P.C.; Edward Steakley

(57) ABSTRACT

Methods, systems, and apparatus, including computer programs encoded on computer storage media for pathological anomaly detection in CT scan images and generation of a summary graphic image. The generated summary graphic image includes a abnormality presence indication section, a detected findings section, a findings location section, and an undetected findings section. The generated summary graphic image is inserted into a DICOM file that is viewable by a software system interacting with a picture archiving and communication system (PACS).

28 Claims, 13 Drawing Sheets

FIG. 4A

PATHOLOGICAL ANOMALY DETECTION IN DICOM IMAGES AND GENERATION OF A SUMMARY IMAGE

CROSS-REFERENCE TO RELATED APPLICATIONS

This application is a non-provisional application of U.S. provisional application 63/558,425, filed on Feb. 27, 2024, which is incorporated by reference, and priority is claimed thereto.

FIELD

This patent application relates generally to pathological anomaly detection in images, and more particularly, to systems and methods for pathological anomaly determination in DICOM images and the generation of a summary image for insertion to a DICOM file.

SUMMARY

Methods, systems, and apparatus, including computer programs encoded on computer storage media for pathological anomaly detection in CT scan images and generation of a summary graphic image are described herein. The generated summary graphic image includes an abnormality presence indication section, a detected findings section, a findings location section, and an undetected findings section. The generated summary graphic image is inserted into a DICOM file that is viewable by a software system interacting with a picture archiving and communication system (PACS).

The appended claims may serve as a summary of this application.

BRIEF DESCRIPTION OF THE DRAWINGS

Figure 4A:
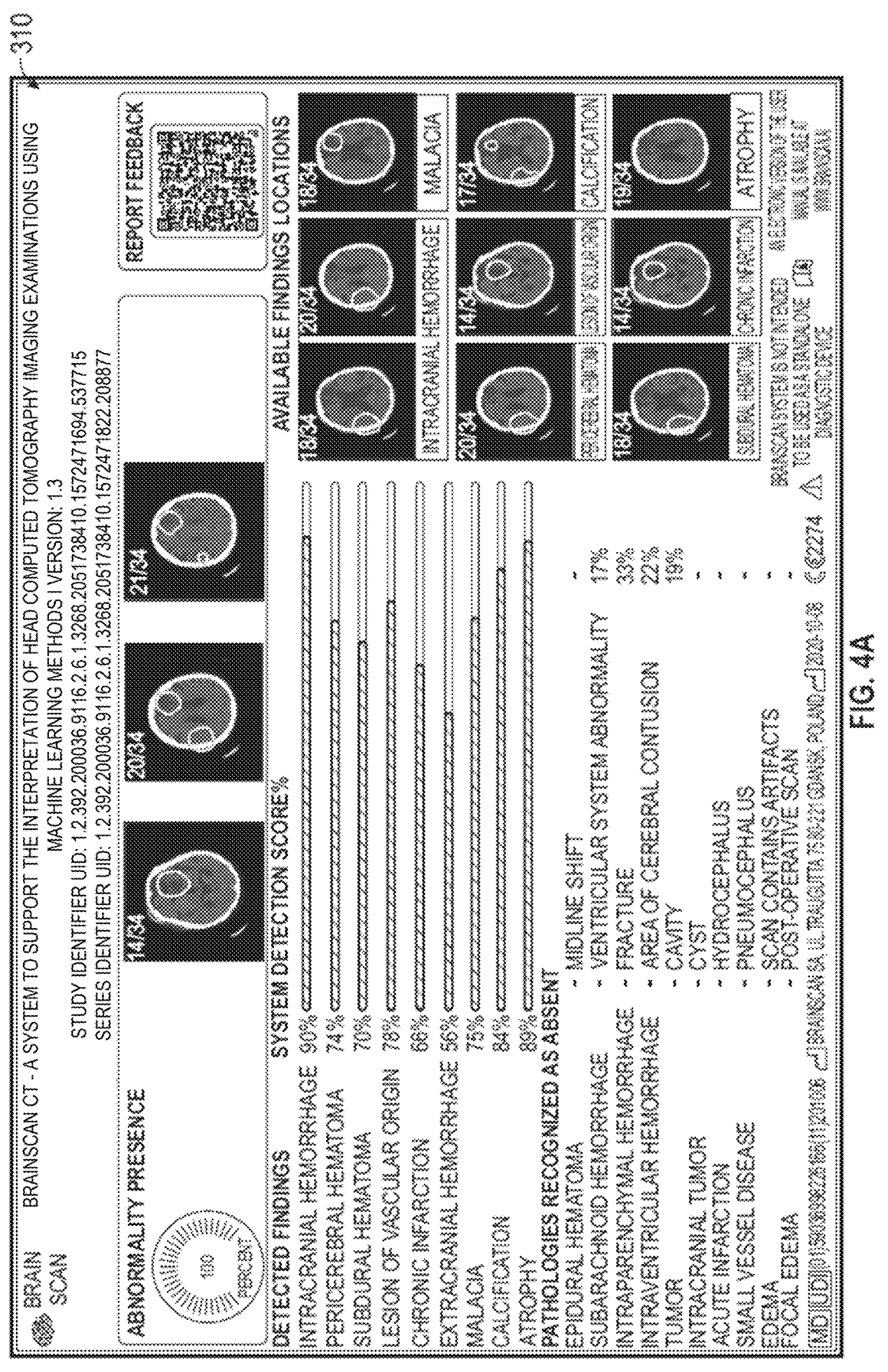

FIGS. 4A-4E are diagrams illustrating aspects of the generated summary image.

DETAILED DESCRIPTION OF THE DRAWINGS

Figure 1A:
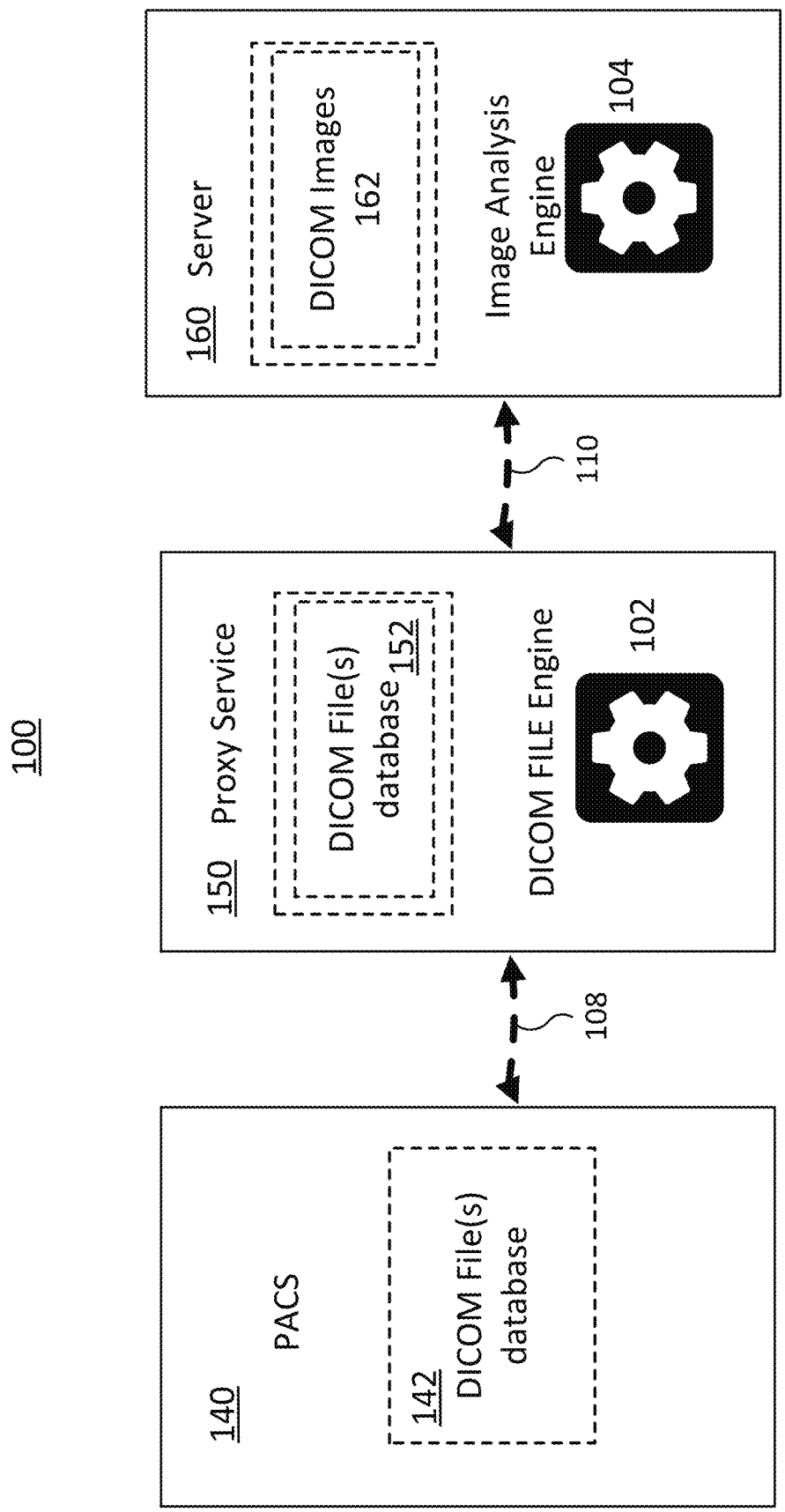
FIG. 1A is a diagram illustrating an exemplary environment in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

FIG. 1A is a diagram illustrating an exemplary environment in which some embodiments may operate. In some embodiments, the system includes a proxy server 150 that interacts and communicates, via a communication link 108, with a PACS 142 for the retrieval and handling of DICOM files from a DICOM file database 142. The proxy server 150 communicates, via communication links 110 and interacts with a server 160.

In an embodiment, the DICOM File engine 102, the image Analysis engine 104 may perform the method 200 other methods described herein and, as a result, provide for a system and method for pathological anomaly detection in DICOM images and generation of a summary image.

Figure 1B:
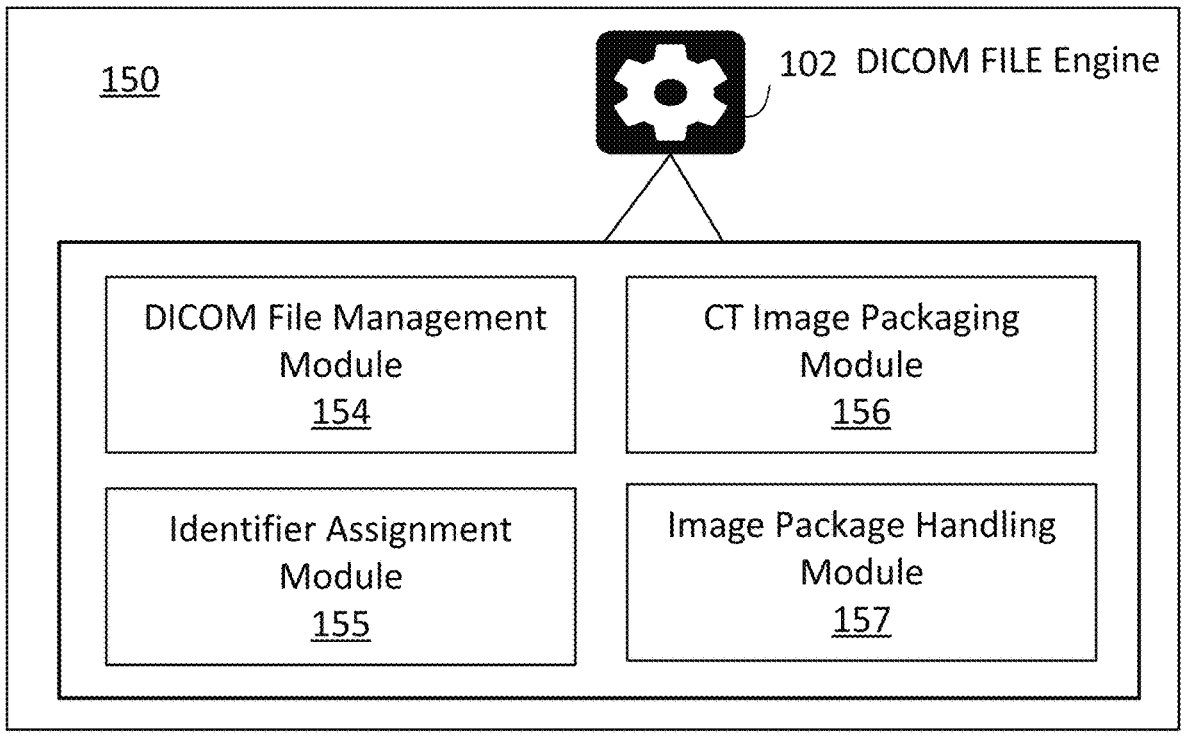
FIG. 1B is a diagram illustrating an exemplary computer system with software and/or hardware modules that may execute some of the functionality described herein.

FIG. 1B is a diagram illustrating an exemplary computer 150 with software and/or hardware modules that may execute some of the functionality described herein. The proxy service 150 includes multiple modules performed by the DICOM File Engine 102. In some embodiments, the modules include a DICOM File Management module 154, an Identifier Assignment Module 155, a CT Image Packaging Module 156 and an Image Package Handling Module 157.

The DICOM File Management Module 154 is configured to perform functionality for the handling, interaction with and storage of a DICOM File in relation to a PACS. The Identifier Assignment Module 155 is configured to generate one or more unique identifiers to be assigned to a particular DICOM file. The one or more unique identifiers provides a means to anonymize the CT image data from any identifiable patient data. The CT Image Packaging Module 156 is configured to extract CT images from a DICOM file and create a data package of the CT images and the one or more unique identifiers. The Image Package Handling Module 157 is configured to provide functionality to securely transmit the created data package to the server 160.

Figure 1C:
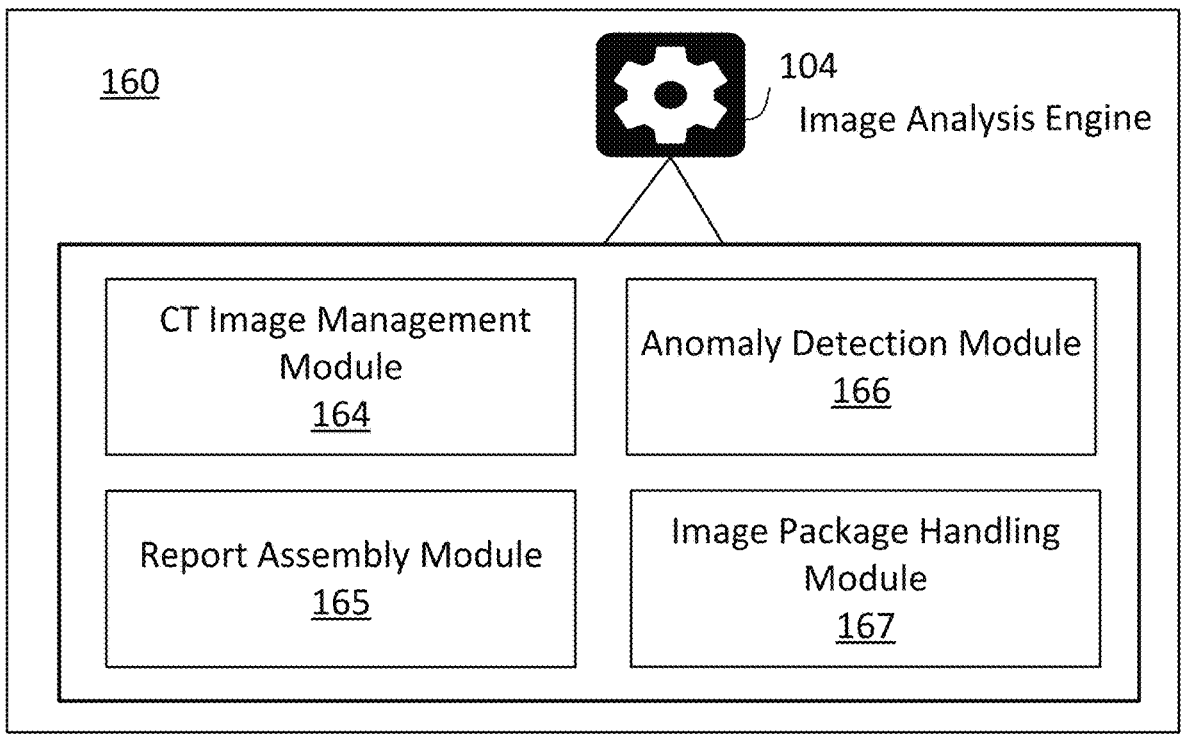
FIG. 1C is a diagram illustrating an exemplary computer system with software and/or hardware modules that may execute some of the functionality described herein.

FIG. 1C is a diagram illustrating an exemplary computer 160 with software and/or hardware modules that may execute some of the functionality described herein. The server 160 includes multiple modules performed by the Image Analysis Engine 104. In some embodiments, the modules include a CT Image Management Module 164, a Report Assembly Module 165, and Anomaly Detection Module and an Image Package Handling Module 167.

The CT Image Management Module 164 is configured to perform file handling and file management of the received CT images. The Report Assembly Module 165 is configured to perform functionality to assemble and generate a summary graphic based on the evaluation and determination of the occurrence of pathological anomalies in the CT images. The Anomaly Detection Module 166 is configured to perform pathological anomaly detection of the CT images. The Image Package Handling Module 167 is configured to perform functionality to receive and handle the data package created by the proxy service 150, and to securely transmit a summary graphic from the server 160 to the proxy service 150.

In some embodiments, the Anomaly Detection Module 166 includes an artificial intelligence system, such as one or more trained machine learning models. In some embodiments, the machine learning model is trained via supervised training using one or more data sets of CT images including known specific pathological anomalies. After training, the model is capable of receiving CT images and evaluating the pixels of the images to identify the occurrence or likelihood of different pathological anomalies. For example, the artificial intelligence system may determine multiple possible anomalies in a CT image or images. The artificial intelligence system may evaluate for different possible pathological anomalies and assign a confidence or likelihood of the particular type of pathological anomaly that is found in the CT image. Moreover, the artificial intelligence system generates information indicating the area of the CT image where the pathological anomaly is found to exist.

In some embodiments, the machine learning model is configured to receive as input multiple images of the CT scan, for example receiving a 3D model of a brain comprising multiple image slices. The machine learning model may evaluate the multiple images slices and determine the occurrence of a pathological anomaly in a single image slice and/or determine the occurrence of a pathological anomaly occurring in multiple image slices.

In some embodiments, the machine learning model is trained to determine a general pathology anomaly confidence or likelihood value of a non-specific pathological anomaly occurring in the CT images. As described herein, this confidence or likelihood value may be presented in the summary image as a pathology anomaly presence indication score (e.g., ranging from 0-100%). This score generally indicates that a pathological anomaly exists in the CT images.

In some embodiments, the Report Assembly Module 165 uses the information generated by the artificial intelligence system to organize the placement of information into different section of a summary image. For example, the artificial intelligence system may generate a listing or vector of each CT images that was input into the artificial intelligence system. The CT image may be associated with one or more different pathological anomalies, a confidence or likelihood value of the occurrence of the anomaly and information of where the anomaly occurs in the CT image. The system may perform an operation to identify those anomalies where the system has the highest confidence level. The system may then organize the placement of CT images in an organized manner for generation into a summary image.

Figure 2:
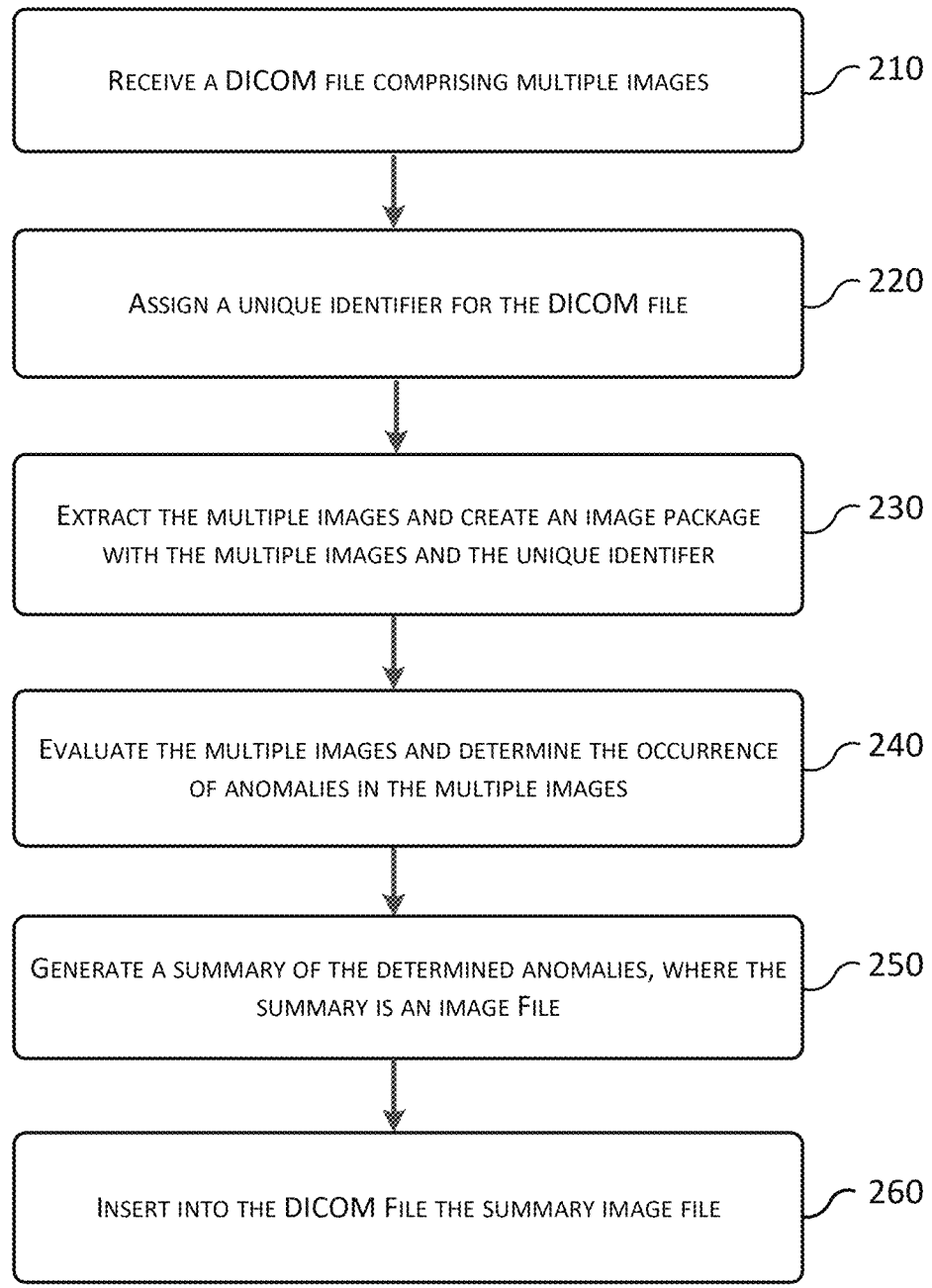
FIG. 2 is a flow chart illustrating an exemplary method that may be performed in some embodiments.

FIG. 2 is a flow chart illustrating an exemplary method 200 that may be performed in some embodiments. Method 200 is performed by the system which analyses images obtained from a DICOM file, determines pathological anomalies in the images and generates a summary image describing the determined pathological anomalies.

In step 210, the system receives a DICOM file that includes multiple images. For example, a computer tomography (CT) image scan may be performed on an individual, and the CT image data in the form of CT images is stored in a DICOM file (also referred to as a DICOM container). In some embodiments, the DICOM file is received by a proxy service 150 (as described herein) that is in communication with a PACS (i.e., Picture Archiving And Communication System).

In step 220, the system assigns one or more unique identifiers that uniquely are associated to the DICOM file. For example, in some embodiments, a series identifier UID and a study identifier UID are assigned to the DICOM file. The DICOM file may be generated with a unique hash or other unique value to refer to the DICOM file. The UID values provide a unique and anonymous reference value to the DICOM value without any reference to any patient information.

In step 230, the system extracts the multiple images from the DICOM file and creates an image package including the textual information of the one or more unique identifier. The image package then may be securely transferred by the proxy service 150 to a remote server 160 for image analysis.

In step 240, the system receives the image package and performs an evaluation of the multiple images to determine pathological anomalies in the multiple images. For example, the system may input each CT scanned image into an artificial intelligence system (e.g., a trained machine learning network or model) that evaluates each image to identify the occurrence or presence of pathological anomalies in the image. In some embodiments, the artificial intelligence system determines the likelihood (such as a confidence level of an occurrence) of a particular type of pathological anomaly and generates a heatmap or boundary area identify the location in the image of the deterred pathological anomaly.

In step 250, the system generates an image file representing a summary of the determined pathological anomalies. The generated image file is in an image format suitable to be inserted into a DICOM file. The generated image file includes summary information of identified pathological anomalies and one or more unique identifiers. The server 160 transmits the generated image file to the proxy service 150.

In step 260, the proxy service 150 inserts the generated image file into the DICOM file. The DICOM file is then made available to the PACS where the generated image may be reviewed.

Figure 3:
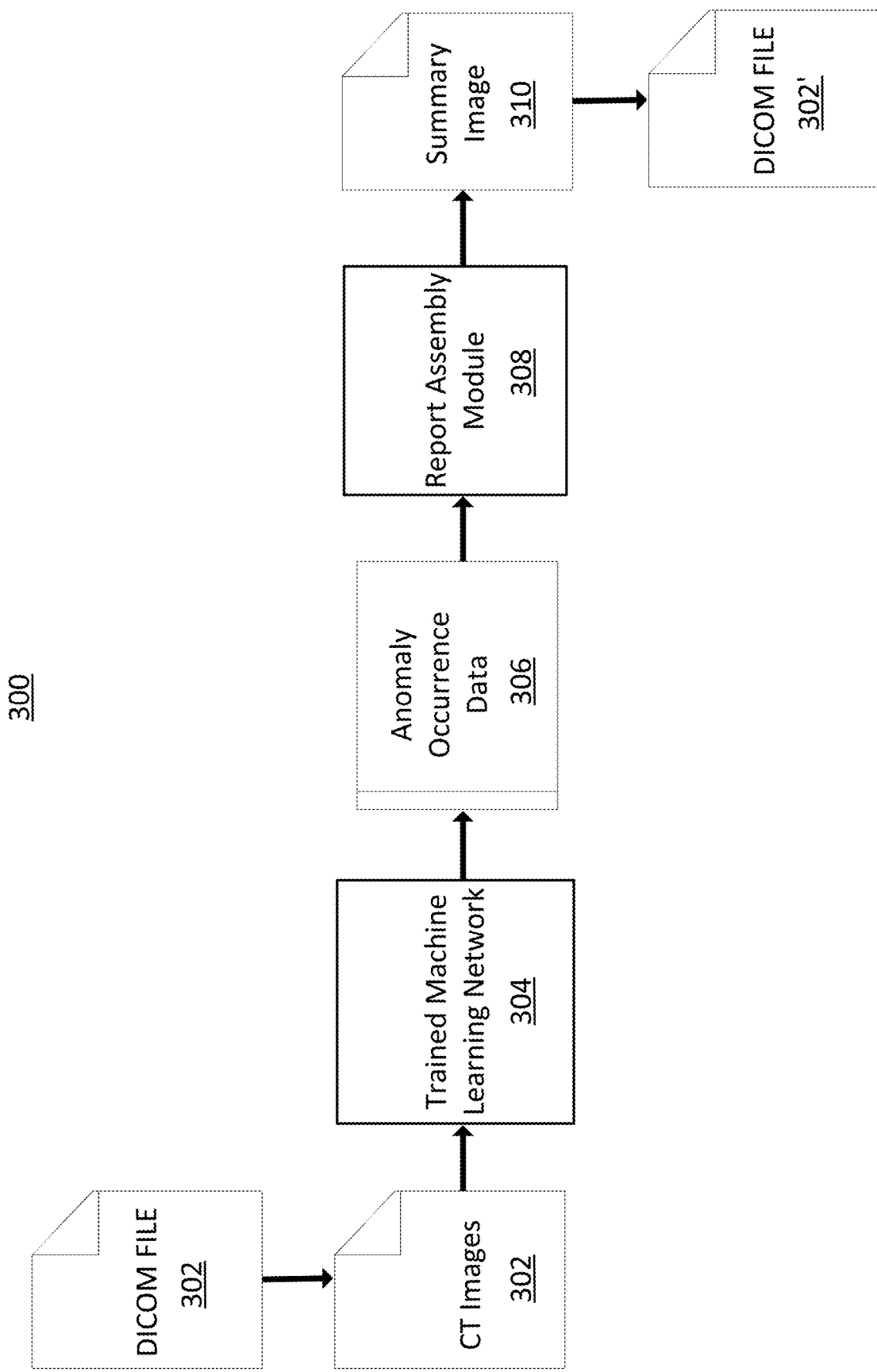
FIG. 3 is a diagram process pathological anomaly detection and summary image generation.
Figure 4B:
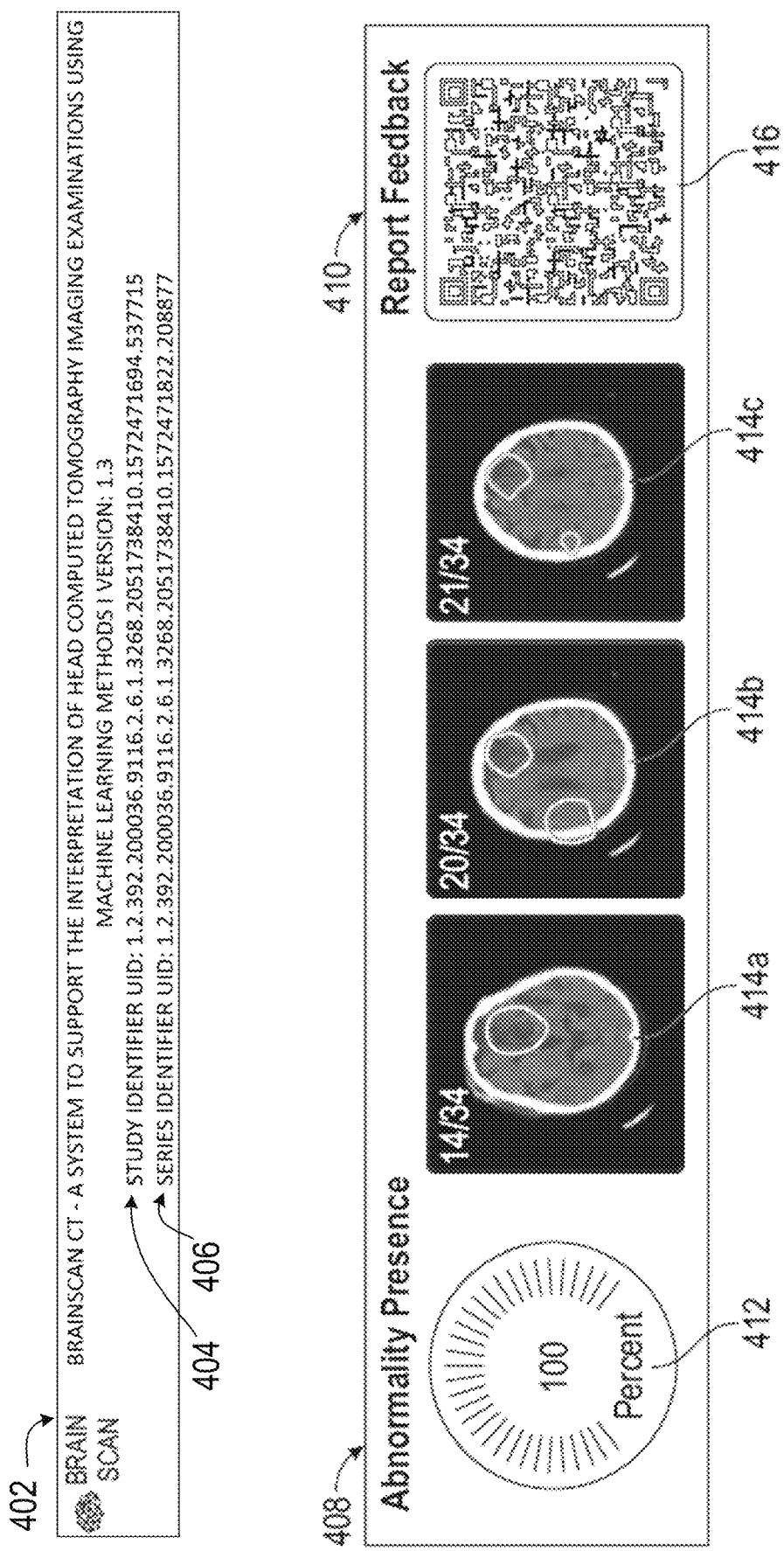
Figure 4C:
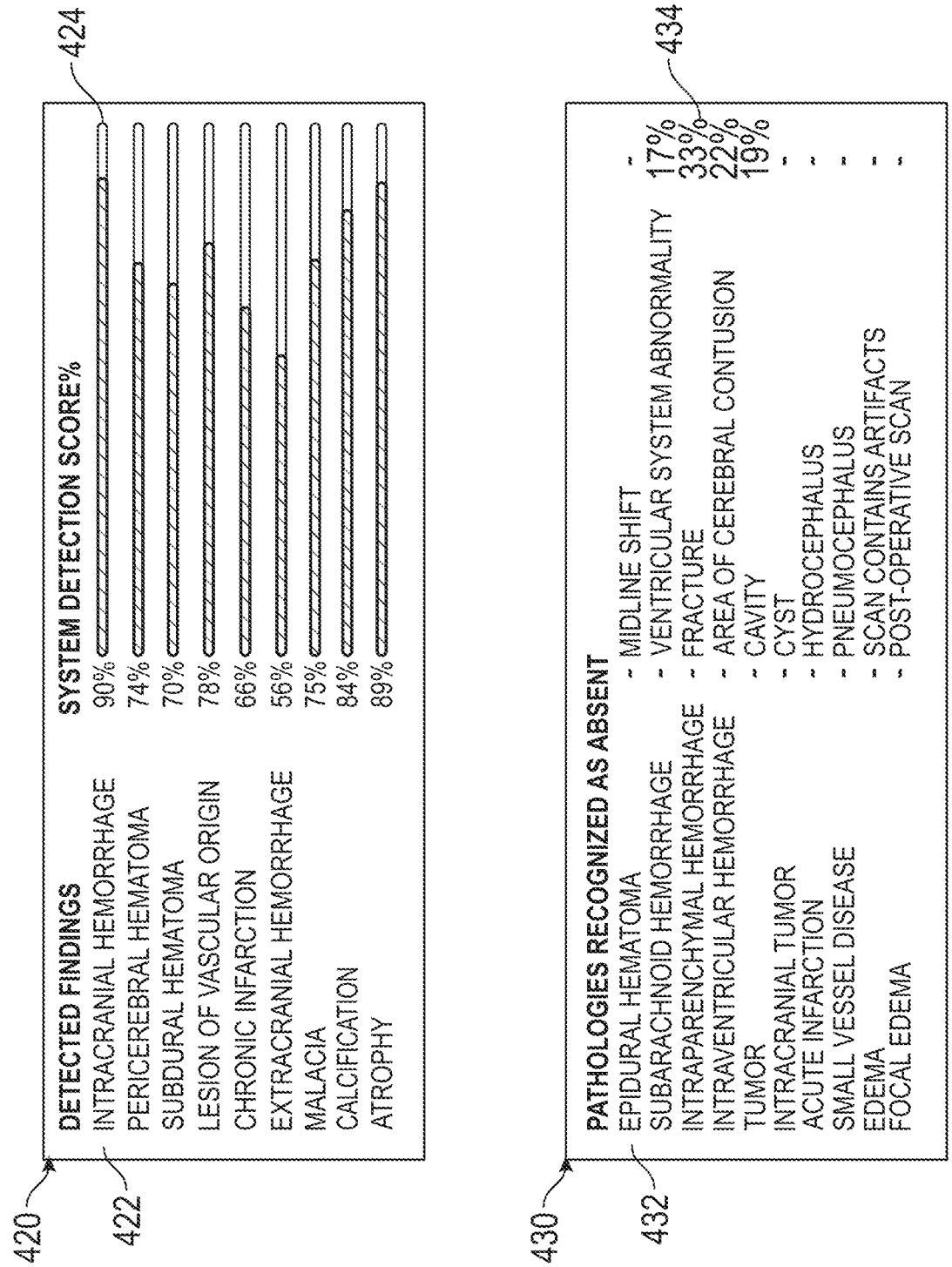
Figure 4D:
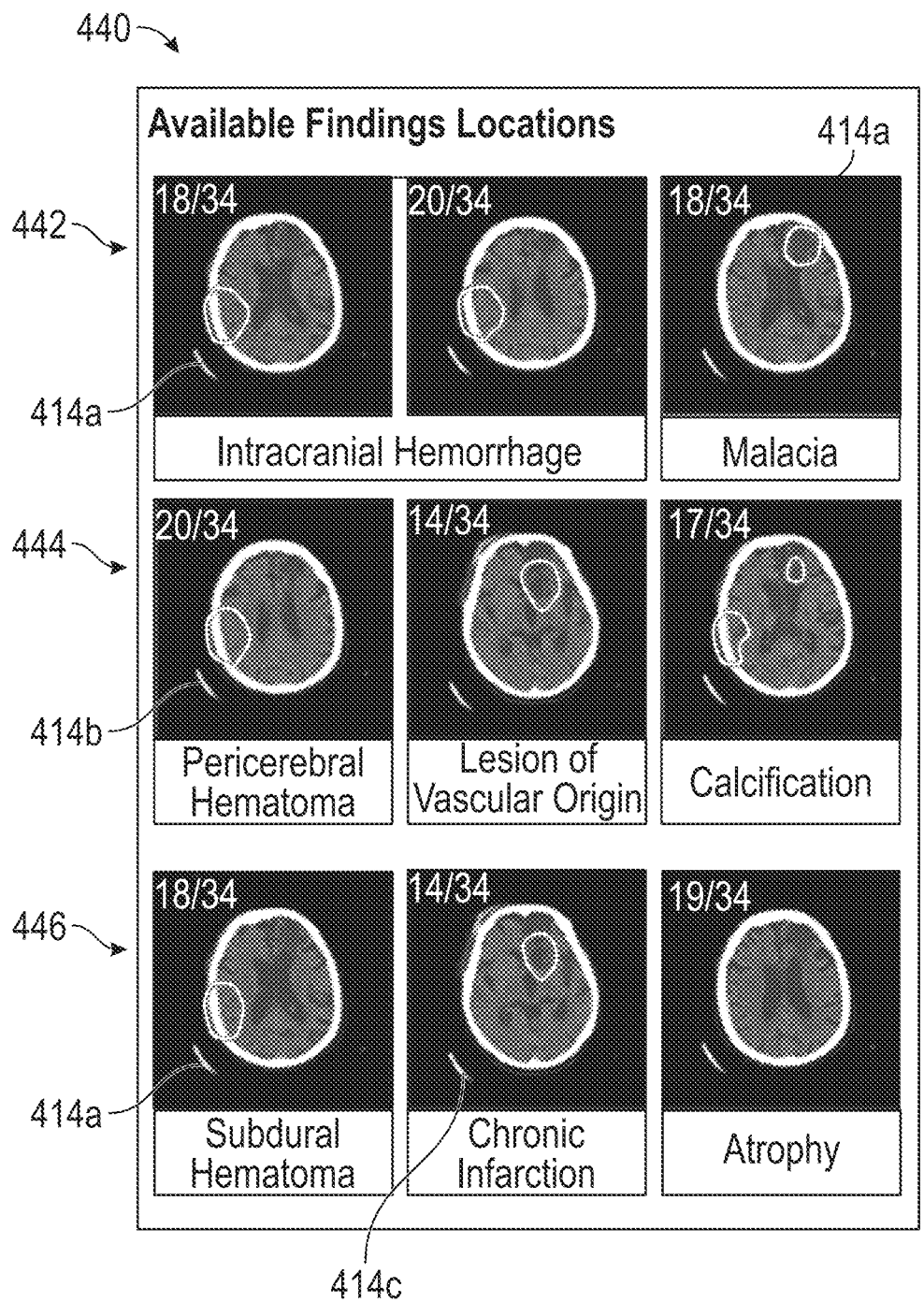
Figure 4E:
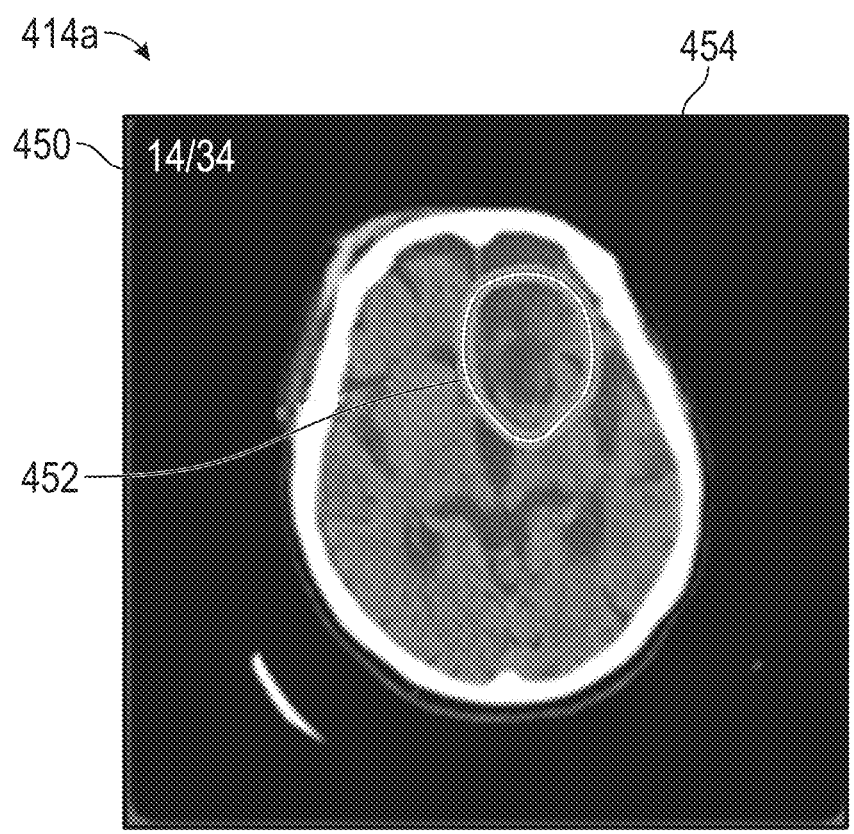

FIG. 3 is a diagram illustrating a process pathological anomaly detection and summary image generation. A DICOM File 302 is received and CT images 302 are extracted from the DICOM File. The CT images 302 are input into a trained machine learning network 304. The trained machine learning network 304 evaluates the input CT images and generates anomaly occurrence data 306. A report assembly module 308 uses the anomaly occurrence data and assembles a summary image file 310. The summary image file is reinserted into the DICOM file to create a new version of the DICOM File 302' with the inserted summary image file.

FIGS. 4A-4E are diagrams illustrating aspects of the generated summary image 310. The system organizes and selects representative images depicting detected pathological anomalies of the evaluated CT images. The system organizes data pertaining to the detected pathological anomalies and generates a summary graphic describing the detected pathological anomalies.

In some embodiments, the summary graphic is organized with different sections that describe aspects of the detected pathological anomalies. For example, the summary graphic may include a header section 402, a report feedback section 406, a abnormality presence indication section 408, a detect findings section 420, an undetected findings section 430 and a findings location section 440.

The header section 402 includes a series identifier UID 404 and a study identifier UID 406. The UIDs 404, 406 are associated with a DICOM file from which CT images are obtained.

The abnormality presence indication section 408 includes a pathology anomaly presence indication score 412. For example, the pathology anomaly presence indication score 412 may be represented as a numeric value and a graphical indication. The abnormality presence indication section may include multiple images 414a, 414b, 414c that represent examples of detected pathological anomalies.

A report feedback section 406 includes a QR code 416. The QR code allows a reviewer to use the QR code to generate feedback, for example via an email message. The QR code includes information with an email address for sending the feedback information.

The detected findings section 420 includes a listing of detected findings. In some embodiments, a particular pathological anomaly must meet a predetermined confidence percentage to be listed in the detected findings section (e.g., where the system confidence level is >=50%). The example detected findings section 420 may include a graph 424 place in proximity with the particular detected pathological anomaly. In the example, pathological anomalies detected by the machine learning network includes intracranial hemorrhage (90%), pericerebral hematoma (74%), subdural hematoma (70%), lesion of vascular origin (78%), chronic infarction (66%), etc.

In some embodiments, each of the pathological anomalies detected by the system have a pre-assigned ranking value. Those pathological anomalies that meet the confidence level (e.g., >=50%) are presented in the summary image 310 in the listing of detected findings 420 by descending highest ranking value. For example, an Intracranial hemorrhage anomaly may be assigned a ranking value of 100, apericereral hemorrhage anomaly may be assigned a ranking value of 95, and a lesion of vascular original anomaly may be assigned a ranking value of 80. Based on these ranking values, these detected anomalies would be placed by the system in the summary image 310 as shown in FIG. 4A.

In other embodiments, section 420 includes a listing of detected pathological anomalies 422 with the highest top number of ranked findings by a system confidence percentage.

The available findings location section 440 includes a listing of sample images of detected findings. In some embodiments, the particular pathological anomalies listed in section 440 correspond to the top n number of pathological anomalies listed in the detected findings section 420. For example, the rows of CT images presented in the findings location section 440 may be based on a pre-assigned ranking value (as described) for each pathological anomaly that the system is configured to detect.

In other embodiments, the listing of sample images corresponds to a pre-assigned rank or order assigned to a particular pathological anomaly. For example, the anomaly intracranial hemorrhage may be assigned a rank order of 1, edema as 5 and focal edema as 7. The system will list in the generated summary images the detected anomalies in their respective pre-assigned rank order. The system determines an order of presentation in the summary graphic image for an anomaly based on the pre-assigned rank of a respective determined pathological anomaly.

In some embodiments, based on the highest confidence percentage, the system will select CT images corresponding to the detected pathological anomalies and add the CT images to the findings location section 440. For example, the system selected the images in row 442 depicting representative samples of two CT images where the system detected an anomaly of an intracranial hemorrhage. Row 442 also includes an image representing a Malacia anomaly. The system selected the images in row 444 depicting representative samples of the CT images where the system detected an anomaly of a Pericerebral hematoma, Lesion of vascular origin and Calcification. The system selected the images in row 446 depicting representative samples of the CT images where the system detected an anomaly of a Subdural hematoma, Chronic Infarction and an Atrophy.

It should be noted that the system may determine that a particular CT image indicates multiple pathological anomalies. For example, image 414a is depicted in multiple rows 442, and 446. In this example, the system has determined that CT image 414a indicates the existence of intracranial hemorrhage, malacia and subdural hematoma in image 18/34. In other words, the system is able to detect multiple pathological anomalies in a single CT image. Also, in some embodiments the system selects at least one representative CT image from each of the top pathological anomalies as the representative images in the abnormality presence indication section 408.

While the findings location section 440 depicts a 3×3 grid, the grid may include more or less rows and more or less image slices per row. For example, a row may have 1, 2 or 3 images included in the row representing a particular detected pathological anomaly.

The undetected findings section 430 includes a listing of undetected findings. This section includes a listing of undetected pathological anomalies 432. The undetected pathological anomalies would include those anomalies that considered by the system, but the system confidence level is 0 or below a predetermine percentage (e.g., the system confidence level is <50%). In some situations, the system determines the occurrence of a pathological anomaly, but the system confidence percentage 434 does not meet the required threshold value. In the example, such instances include ventricular system abnormality (17%), fracture (33%), area of cerebral contusion (22%) and cavity (19%). While exceeding a required threshold, this information may be useful to a person considering possible anomalies.

In some embodiments, the system may create a thumbnail image of a CT image. The thumbnail image 414a includes a depicting of the original CT image with a graphical indication 452 of an area of the CT image 454 where the pathological anomaly was determined. A reference 450 of the image number (14/34) may be displayed. The graphical indication 452 may include a boundary, heat map or other graphical indication of the location in the image of where the pathological anomaly is detected.

Figure 5:
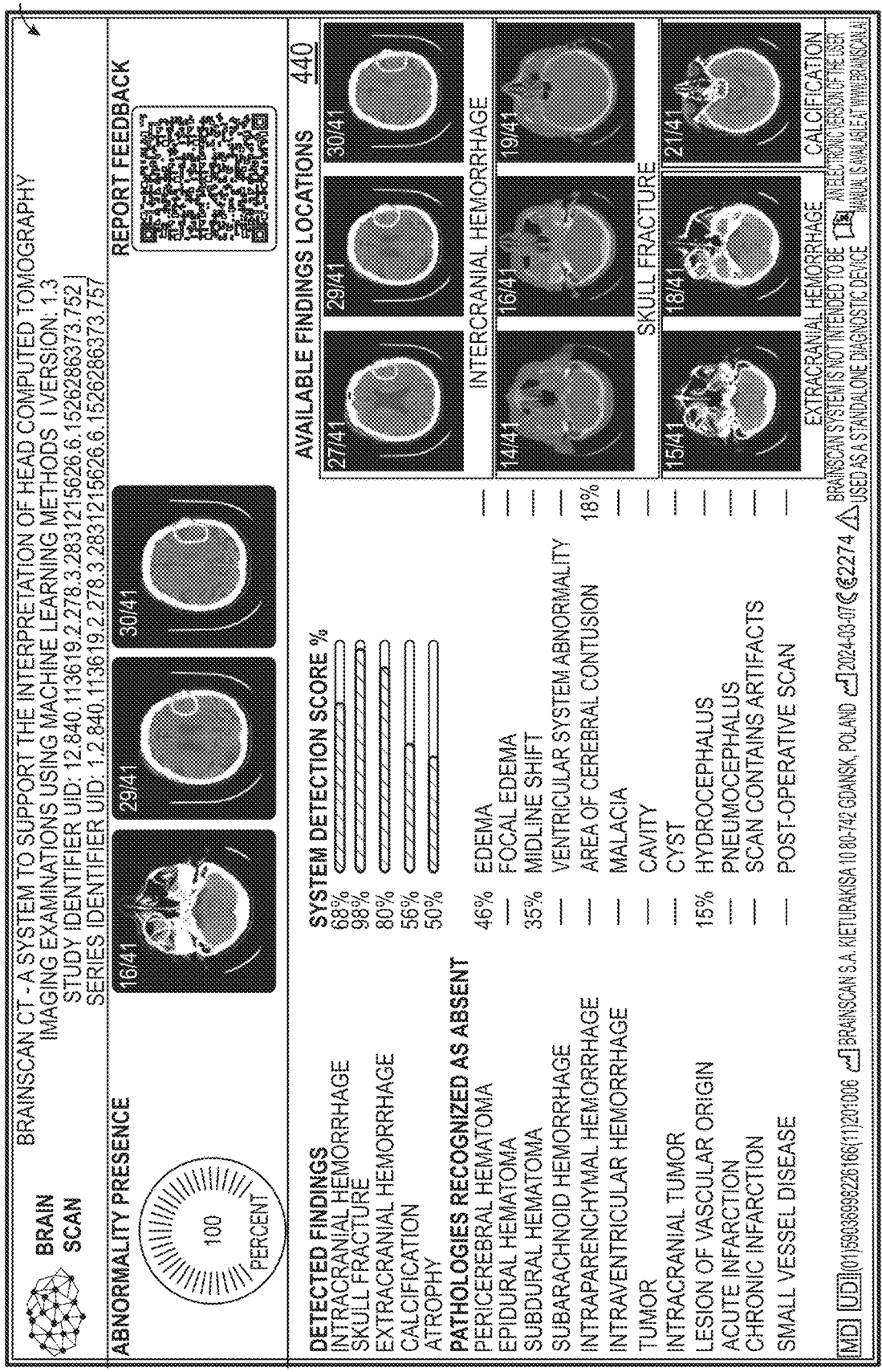
FIG. 5 is a diagram illustrating another example of generated summary image.

FIG. 5 is a diagram illustrating another example of a generated summary image. In this example, the system determines an abnormality presence of 100 percent. Example, images 16/41, 29/41 and 30/41 are images selected by the system and presented as representative images indicating the abnormalities. The selects and places in the available findings location portion 440 representative images of different pathologies identified by the system. In this example, the system depicts 3 images representing areas of intercranial hemorrhage (images 27/41, 29/41 and 30/41), a skull fracture (images 14/41, 16/41 and 19/41), extracranial hemorrhage (images 15/41 and 18/41) and a calcification pathological anomaly (image 21/41). In some embodiments, the image for pathological anomalies for bone fractures may be displayed in a bone window here the contrast of the image is adjusted to a different contrast than the other pathological anomalies that may be found in other types of tissue or the brain.

Figure 6:
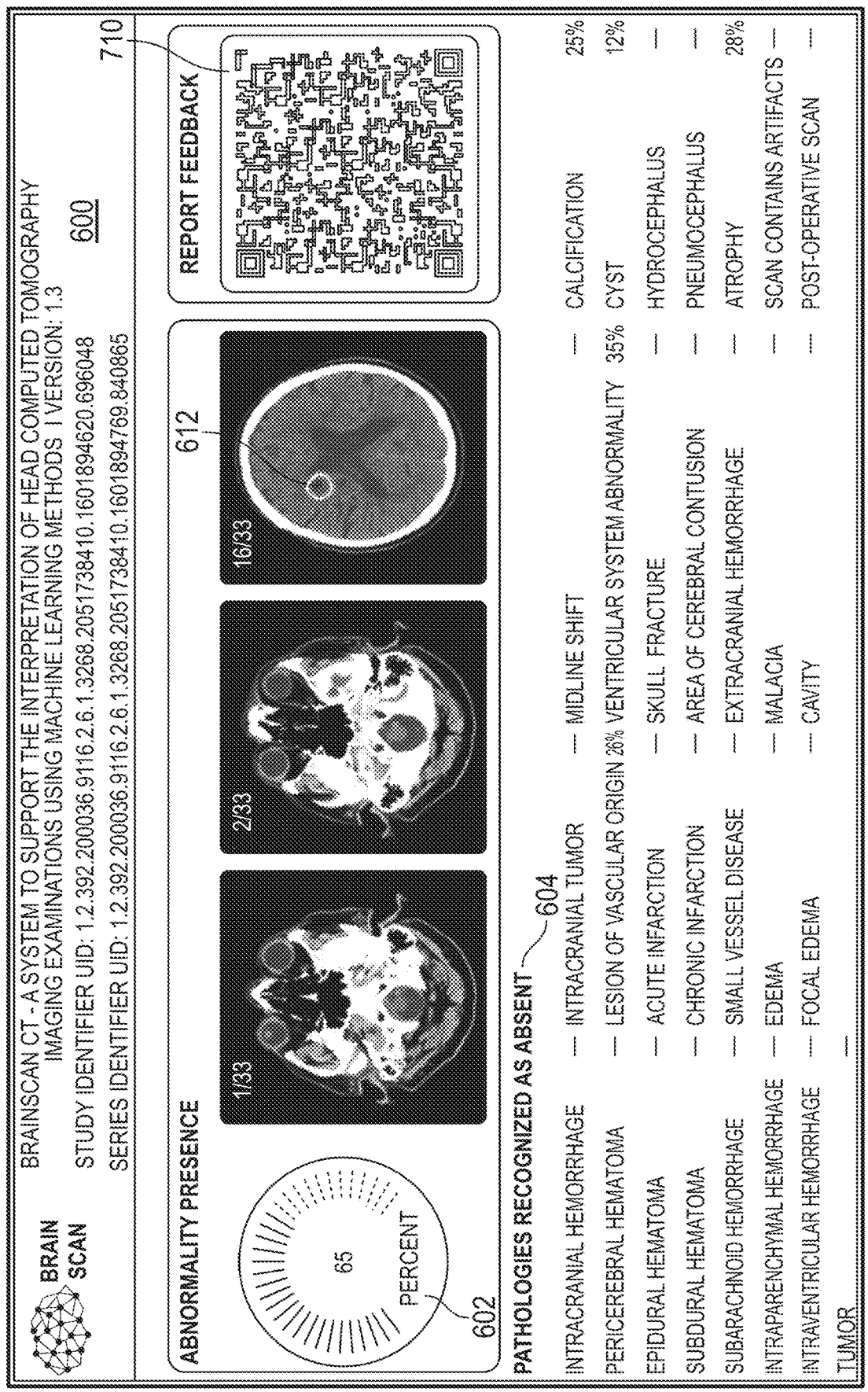
FIG. 6 is a diagram illustrating a no pathological anomaly detected summary image.

FIG. 6 is a diagram illustrating a no pathological anomaly detected summary image 600. In some instances where the system evaluates the CT images, the system determines that no pathological anomalies are detected. For example, the system does not meet a particular confidence level for each of the evaluated anomalies, the system may generate a summary image that indicates no pathological anomalies of significance have been detected. In this situation, the summary graphic may include a plurality of representations of the CT images in the summary graphic without any anomaly area indicated in the CT image. The summary graphic may also a plurality of representation of the CT images in the summary graphic with a possible anomaly area identified in the image 612.

In some embodiments, the summary image 600 includes an abnormality presence and abnormality presence score indicator 602 representing a percentage presence of pathological anomalies detected (e.g., 65%) in the CT images. The summary image includes a section of pathologies recognized as absent 604. The listing includes the pathologies the system is capable of detecting but has not found the occurrence of those pathologies in the CT images.

In some embodiments, the summary image 600 includes one or more images of the CT images depicting normal images that do not have a determined pathology. Summary image 600 may also include a report feedback section with a QR code 510 where a reviewer may use to create an email to provide feedback regarding the summary image information.

Figure 7:
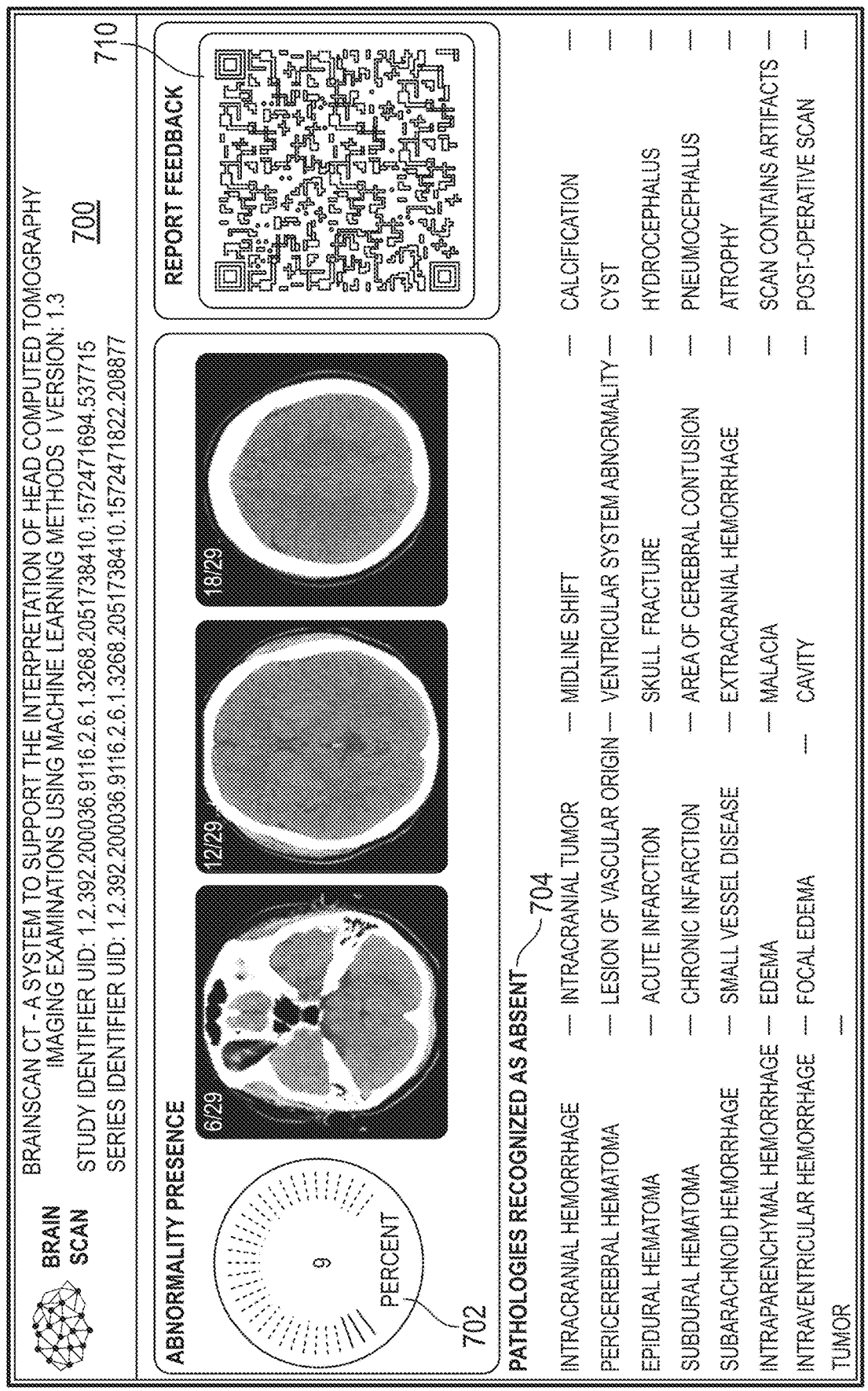
FIG. 7 is a diagram illustrating a no pathological anomaly detected summary image.

FIG. 7 is a diagram illustrating another example of no pathological anomaly detected summary image 700. In some instances where the system evaluates the CT images, the system determines that no pathological anomalies are detected. For example, the system does not meet a particular confidence level for each of the evaluated anomalies, the system may generate a summary image that indicates no pathological anomalies of significance have been detected. In this situation, the summary graphic may include representations of the CT images in the summary graphic without any anomaly area indicated in the CT image.

In some embodiments, the summary image 700 includes an abnormality presence and an abnormality presence score indicator 702 representing a percentage presence of pathological anomalies detected (e.g., 9%) in the CT images. The summary image includes a section of pathologies recognized as absent 704. The listing includes the pathologies the system is capable of detecting but has not found the occurrence of those pathologies in the CT images.

In some embodiments, the summary image 700 includes one or more images of the CT images depicting normal images that do not have a determined pathology. Summary image 700 may also include a report feedback section with a QR code 710 where a reviewer may use to create an email to provide feedback regarding the summary image information.

Figure 8:
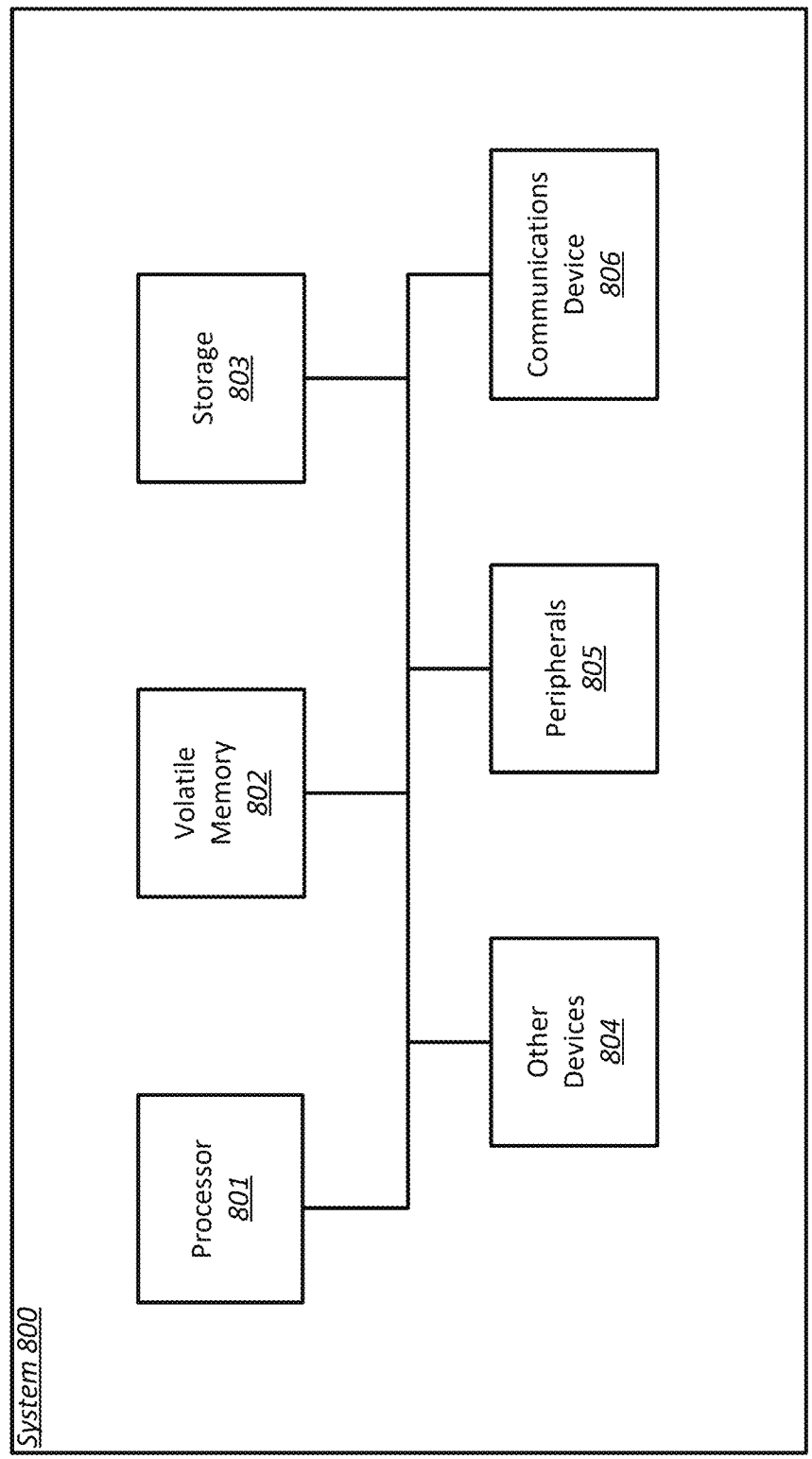
FIG. 8 is a diagram illustrating an exemplary computer that may perform processing in some embodiments.

FIG. 8 is a diagram illustrating an exemplary computer that may perform processing in some embodiments. Exemplary computer 800 may perform operations consistent with some embodiments. The architecture of computer 800 is exemplary. Computers can be implemented in a variety of other ways. A wide variety of computers can be used in accordance with the embodiments herein.

Processor 801 may perform computing functions such as running computer programs. The volatile memory 802 may provide temporary storage of data for the processor 801. RAM is one kind of volatile memory. Volatile memory typically requires power to maintain its stored information. Storage 803 provides computer storage for data, instructions, and/or arbitrary information. Non-volatile memory, which can preserve data even when not powered and including disks and flash memory, is an example of storage. Storage 803 may be organized as a file system, database, or in other ways. Data, instructions, and information may be loaded from storage 803 into volatile memory 802 for processing by the processor 801.

The computer 800 may include peripherals 805. Peripherals 805 may include input peripherals such as a keyboard, mouse, trackball, video camera, microphone, and other input devices. Peripherals 805 may also include output devices such as a display. Communications device 806 may connect the computer 800 to an external medium. For example, communications device 806 may take the form of a network adapter that provides communications to a network. A computer 800 may also include a variety of other devices 804. The various components of the computer 800 may be connected by a connection medium such as a bus, crossbar, or network.

It will be appreciated that the present disclosure may include any one and up to all of the following examples.

Example 1: A system for pathological anomaly detection and summary image generation, comprising one or more processor configured to perform the operations of: receiving multiple CT images; determining the occurrence of pathological anomalies in the multiple CT images; and generating a summary graphic image of determined pathological anomalies, wherein the summary graphic image comprises: a first portion of the summary graphic image including a abnormality presence indication section comprising a first group of sample images generally representing the determined pathological anomalies; a second portion of the summary graphic image including a detected findings section comprising a textual listing of specific detected pathological anomaly findings; a third portion of the summary graphic image including a findings location section comprising representative a second group of sample images of specific multiple determined pathological anomalies; and a fourth portion of the summary graphic image including an undetected findings section comprising a textual listing of specific undetected pathological anomaly findings.

Example 2. The system of Example 1, further comprising: receiving a DICOM file comprising the multiple CT images; assigning one or more unique identifiers in association with the received DICOM file; and determining the pathological anomalies by inputting the multiple CT images into a trained machine learning model; and inserting into the DICOM file, the generated summary graphic image.

Example 3. The system of any one of Example 1-2, wherein the summary graphic image comprises: a fifth portion of the summary graphic including the assigned one or more unique identifiers in association with the received DICOM file.

Example 4. The system of any one of Example 1-3, wherein the summary graphic image comprises a listing of pathological anomalies that do not meet a threshold level of confidence.

Example 5. The system of any one of Example 1-4, wherein the summary graphic image comprises another portion indicating a pathology anomaly presence indication score, wherein the another portion includes a numeric value and a graphical indication of the pathology anomaly presence indication score.

Example 6. The system of any one of Example 1-5, wherein the summary graphic image comprises another portion including a QR code configured with email information for providing feedback from a reviewer of the summary graphic image.

Example 7. The system of any one of Example 1-6, wherein the first group of sample images and the second group of sample images are thumb-nail image representations of at least one of the multiple CT images.

Example 8. The system of any one of Example 1-7, wherein the first portion depicts one or more of the same sample images as depicted in the third portion.

Example 9. The system of any one of Example 1-8, wherein the thumb-nail image representations include a reference number of a position and total number of the multiple CT images.

Example 10. The system of any one of Example 1-9, wherein the thumb-nail image representations include an area of an image of the multiple CT images depicting a graphical indication of an area of a determined pathological.

Example 11. The system of any one of Example 1-10, wherein the third portion comprises: multiple sample images arranged in a row of a first determined pathological anomaly; multiple sample images arranged in a row of a second determined pathological anomaly; multiple sample images arranged in a row of a third determined pathological anomaly; wherein the first determined pathological anomaly, the second determined pathological anomaly, and the third determined pathological anomaly are different determined pathological anomalies from each other.

Example 12. The system of any one of Example 1-11, further comprising the operations of: selecting a group of multiple images representing different determined pathological anomalies; and adding the selected group of multiple images representing the different determined pathological anomalies to the first portion of the summary graphic image.

Example 13. The system of any one of Example 1-12, further comprising the operations of: selecting a first group of multiple images representing a determined pathological anomaly; adding the selected first group of multiple images representing the specific determined pathological anomaly to the third portion of the summary graphic image; selecting a second group of multiple images representing an another determined pathological anomaly; and adding the selected second group of multiple images representing the another determined pathological anomaly to the third portion of the summary graphic image.

Example 14. The system of any one of Example 1-13, further comprising the operations of: determining an order of presentation in the summary graphic image for an anomaly, based on a pre-assigned rank of a respective determined pathological anomaly.

Example 15. A method for pathological anomaly detection and summary image generation, comprising the operations of: receiving multiple images CT images; determining the occurrence of pathological anomalies in the multiple CT images; and generating a summary graphic image of determined pathological anomalies, wherein the summary graphic image comprises: a first portion of the summary graphic image including a abnormality presence indication section comprising a first group of sample images generally representing the determined pathological anomalies; a second portion of the summary graphic image including a detected findings section comprising a textual listing of specific detected pathological anomaly findings; a third portion of the summary graphic image including a findings location section comprising representative a second group of sample images of specific multiple determined pathological anomalies; and a fourth portion of the summary graphic image including an undetected findings section comprising a textual listing of specific undetected pathological anomaly findings.

Example 16. The method of Example 15, further comprising: receiving a DICOM file comprising the multiple CT images; assigning one or more unique identifiers in association with the received DICOM file; and determining the pathological anomalies by inputting the multiple CT images into a trained machine learning model; and inserting into the DICOM file, the generated summary graphic image.

Example 17. The method of any one of Examples 15-16, wherein the summary graphic image comprises: a fifth portion of the summary graphic including the assigned one or more unique identifiers in association with the received DICOM file.

Example 18. The method of any one of Examples 15-17, wherein the summary graphic image comprises a listing of pathological anomalies that do not meet a threshold level of confidence.

Example 19. The method of any one of Examples 15-18, wherein the summary graphic image comprises another portion indicating a pathology anomaly presence indication score, wherein the another portion includes a numeric value and a graphical indication of the pathology anomaly presence indication score.

Example 20. The method of any one of Examples 15-19 wherein the summary graphic image comprises another portion including a QR code configured with email information for providing feedback from a reviewer of the summary graphic image.

Example 21. The method of any one of Examples 15-20, wherein the first group of sample images and the second group of sample images are thumb-nail image representations of at least one of the multiple CT images.

Example 22. The method of any one of Examples 15-21, wherein the first portion depicts one or more of the same sample images as depicted in the third portion.

Example 23. The method of any one of Examples 15-22, wherein the thumb-nail image representations include a reference number of a position and total number of the multiple CT images.

Example 24. The method of any one of Examples 15-23, wherein the thumb-nail image representations include an area of an image of the multiple CT images depicting a graphical indication of an area of a determined pathological.

Example 25. The method of any one of Examples 15-24, wherein the third portion comprises: multiple sample images arranged in a row of a first determined pathological anomaly; multiple sample images arranged in a row of a second determined pathological anomaly; multiple sample images arranged in a row of a third determined pathological anomaly; wherein the first determined pathological anomaly, the second determined pathological anomaly, and the third determined pathological anomaly are different determined pathological anomalies from each other.

Example 26. The method of any one of Examples 15-25, further comprising the operations of: selecting a group of multiple images representing different determined pathological anomalies; and adding the selected group of multiple images representing the different determined pathological anomalies to the first portion of the summary graphic image.

Example 27. The method of any one of Examples 15-26, further comprising the operations of: selecting a first group of multiple images representing a determined pathological anomaly; adding the selected first group of multiple images representing the specific determined pathological anomaly to the third portion of the summary graphic image; selecting a second group of multiple images representing an another determined pathological anomaly; and adding the selected second group of multiple images representing the another determined pathological anomaly to the third portion of the summary graphic image.

Example 28. The method of any one of Examples 15-27 further comprising the operations of: determining an order of presentation in the summary graphic image for an anomaly, based on a pre-assigned rank of a respective determined pathological anomaly.

Example 29. A non-transitory computer readable medium that stores executable program instructions that when executed by one or more computing devices configure the one or more computing devices to perform operations comprising: receiving multiple images CT images; determining the occurrence of pathological anomalies in the multiple CT images; and generating a summary graphic image of determined pathological anomalies, wherein the summary graphic image comprises: a first portion of the summary graphic image including an abnormality presence indication section comprising a first group of sample images generally representing the determined pathological anomalies; a second portion of the summary graphic image including a detected findings section comprising a textual listing of specific detected pathological anomaly findings; a third portion of the summary graphic image including a findings location section comprising representative a second group of sample images of specific multiple determined pathological anomalies; and a fourth portion of the summary graphic image including an undetected findings section comprising a textual listing of specific undetected pathological anomaly findings.

Example 30. The non-transitory computer readable medium of Example 29, further comprising: receiving a DICOM file comprising the multiple CT images; assigning one or more unique identifiers in association with the received DICOM file; and determining the pathological anomalies by inputting the multiple CT images into a trained machine learning model; and inserting into the DICOM file, the generated summary graphic image.

Example 31. The non-transitory computer readable medium of any one of Examples 29-30, wherein the summary graphic image comprises: a fifth portion of the summary graphic including the assigned one or more unique identifiers in association with the received DICOM file.

Example 32. The non-transitory computer readable medium of any one of Examples 29-31, wherein the summary graphic image comprises a listing of pathological anomalies that do not meet a threshold level of confidence.

Example 33. The non-transitory computer readable medium of any one of Examples 29-32, wherein the summary graphic image comprises another portion indicating a pathology anomaly presence indication score, wherein the another portion includes a numeric value and a graphical indication of the pathology anomaly presence indication score.

Example 34. The non-transitory computer readable medium of any one of Examples 29-33, wherein the summary graphic image comprises another portion including a QR code configured with email information for providing feedback from a reviewer of the summary graphic image.

Example 35. The non-transitory computer readable medium of any one of Examples 29-34, wherein the first group of sample images and the second group of sample images are thumb-nail image representations of at least one of the multiple CT images.

Example 36. The non-transitory computer readable medium of any one of Examples 29-35, wherein the first portion depicts one or more of the same sample images as depicted in the third portion.

Example 37. The non-transitory computer readable medium of any one of Examples 29-36, wherein the thumb-nail image representations include a reference number of a position and total number of the multiple CT images.

Example 38. The non-transitory computer readable medium of any one of Examples 29-37, wherein the thumb-nail image representations include an area of an image of the multiple CT images depicting a graphical indication of an area of a determined pathological.

Example 39. The non-transitory computer readable medium of any one of Examples 29-38, wherein the third portion comprises: multiple sample images arranged in a row of a first determined pathological anomaly; multiple sample images arranged in a row of a second determined pathological anomaly; multiple sample images arranged in a row of a third determined pathological anomaly; wherein the first determined pathological anomaly, the second determined pathological anomaly, and the third determined pathological anomaly are different determined pathological anomalies from each other.

Example 40. The non-transitory computer readable medium of any one of Examples 29-39, further comprising the operations of: selecting a group of multiple images representing different determined pathological anomalies; and adding the selected group of multiple images representing the different determined pathological anomalies to the first portion of the summary graphic image.

Example 41. The non-transitory computer readable medium of any one of Examples 29-40, further comprising the operations of: selecting a first group of multiple images representing a determined pathological anomaly; adding the selected first group of multiple images representing the specific determined pathological anomaly to the third portion of the summary graphic image; selecting a second group of multiple images representing an another determined pathological anomaly; and adding the selected second group of multiple images representing the another determined pathological anomaly to the third portion of the summary graphic image.

Example 42. The non-transitory computer readable medium of any one of Examples 29-41, further comprising the operations of: determining an order of presentation in the summary graphic image for an anomaly, based on a pre-assigned rank of a respective determined pathological anomaly.

Some portions of the preceding detailed descriptions have been presented in terms of algorithms, equations and/or symbolic representations of operations on data bits within a computer memory. These algorithmic and/or equation descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

Various general-purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A system for pathological anomaly detection and summary image generation, comprising one or more processor configured to:
   receive multiple CT images;
   determine the occurrence of pathological anomalies in the multiple CT images, by inputting the multiple CT images into a trained machine learning model, wherein the machine learning model is trained via supervised training using one or more data sets of CT images including known specific pathological anomalies, wherein the trained machine learning model is configured to receive CT images and evaluate the pixels of the CT images to identify the occurrence or likelihood of different pathological anomalies, and wherein the trained machine learning model is configured to detect multiple pathological anomalies in a single CT image;
   generate a graphical indication of a location of a pathological anomaly in each image of a plurality of the multiple CT images;
   for a plurality of the determined pathological anomalies, selecting from the multiple CT images a group of images that are sample images indicating a respective pathological anomaly;
   generate a summary graphic image of the determined pathological anomalies, wherein the summary graphic image comprises:
      a first portion of the summary graphic image including an abnormality presence indication section comprising a first group of the sample images generally representing the determined pathological anomalies, the first group of sample images depicting multiple images having a graphical indication of the location of a pathological anomaly;
      a second portion of the summary graphic image including a detected findings section comprising a textual listing of specific detected pathological anomaly findings, wherein a detection score value is displayed for a plurality of the specific detected pathological anomaly findings;
      a third portion of the summary graphic image including a findings location section comprising a representative second group of the sample images of specific multiple determined pathological anomalies, the second group of sample images having a graphical indication of the location of a pathological anomaly in a respective image, wherein a plurality of the images of the representative second group of sample images are the same as a plurality of the first group of the sample images; and
      a fourth portion of the summary graphic image including an undetected findings section comprising a textual listing of specific undetected pathological anomaly findings, wherein a specific undetected pathological anomaly is an evaluated pathological anomaly that is determined to be below a threshold value to be considered a detected pathological anomaly, and wherein a detection score value is displayed for a plurality of the specific undetected pathological anomaly findings; and create a new version of a DICOM file, wherein the new version of the DICOM file comprises the generated summary graphic image.

2. The system of claim 1, wherein one or more processors are further configured to:
receive, via a proxy server, a DICOM file comprising the multiple CT images, wherein the server communicates, via a communications link, with a picture archiving and communication system (PACS), and wherein the DICOM file is obtained from the PACS;
assign one or more unique identifiers in association with the received DICOM file;
extract CT images from the received DICOM file and generate a data package of the extracted CT images and the one or more unique identifiers;
securely transmit the data package to a remote server; and
receive from the remote server, the created new version of the DICOM file;
wherein the summary graphic image further comprises a header section describing a series identifier and a study identifier that are associated with the DICOM file obtained from the PACS.

3. The system of claim 2, a plurality of the images include multiple graphical indications of pathological anomalies detected in an image.

4. The system of claim 3, wherein the summary graphic image comprises a listing of pathological anomalies that do not meet a threshold level of confidence.

5. The system of claim 4, wherein the summary graphic image comprises another portion indicating a pathology anomaly presence indication score, wherein the another portion includes a numeric value and a graphical indication of the pathology anomaly presence indication score.

6. The system of claim 5, wherein the summary graphic image comprises another portion including a QR code configured with email information for providing feedback from a reviewer of the summary graphic image.

7. The system of claim 6, wherein the first group of sample images and the second group of sample images are thumb-nail image representations of at least one of the multiple CT images.

8. The system of claim 7, wherein the first portion depicts one or more of the same sample images as depicted in the third portion.

9. The system of claim 7, wherein the thumb-nail image representations include a reference number of a position and total number of the multiple CT images.

10. The system of claim 7, wherein the thumb-nail image representations include an area of an image of the multiple CT images depicting a graphical indication of an area of a determined pathological.

11. The system of claim 1, wherein the third portion comprises:
a grid of multiple sample images depicting different determined pathological anomalies.

12. The system of claim 1, wherein one or more processors are further configured to:
select a group of multiple images representing different determined pathological anomalies; and
add the selected group of multiple images representing the different determined pathological anomalies to the first portion of the summary graphic image.

13. The system of claim 1, further comprising the operations of:
select a first group of multiple images representing a determined pathological anomaly;
add the selected first group of multiple images representing the specific determined pathological anomaly to the third portion of the summary graphic image;
select a second group of multiple images representing an another determined pathological anomaly; and
add the selected second group of multiple images representing the another determined pathological anomaly to the third portion of the summary graphic image.

14. The system of claim 13, further comprising the operations of:
determine an order of presentation in the summary graphic image for an anomaly, based on a pre-assigned rank of a respective determined pathological anomaly.

15. A method for pathological anomaly detection and summary image generation, comprising the operations of:
receiving multiple CT images;
determining the occurrence of pathological anomalies in the multiple CT images, by inputting the multiple CT images into a trained machine learning model, wherein the machine learning model is trained via supervised training using one or more data sets of CT images including known specific pathological anomalies, wherein the trained machine learning model is configured to receive CT images and evaluate the pixels of the CT images to identify the occurrence or likelihood of different pathological anomalies, and wherein the trained machine learning model is configured to detect multiple pathological anomalies in a single CT image;
generating graphical indication of a location of a pathological anomaly in each image of a plurality of the multiple CT images;
for a plurality of the determined pathological anomalies, selecting from the multiple CT images a group of images that are sample images indicating a respective pathological anomaly;
generating a summary graphic image of the determined pathological anomalies, wherein the summary graphic image comprises:
a first portion of the summary graphic image including an abnormality presence indication section comprising a first group of sample images generally representing the determined pathological anomalies, the first group of sample images depicting multiple images having a graphical indication of the location of a pathological anomaly;
a second portion of the summary graphic image including a detected findings section comprising a textual listing of specific detected pathological anomaly findings, wherein a detection score value is displayed for a plurality of the specific detected pathological anomaly findings;
a third portion of the summary graphic image including a findings location section comprising a representative second group of sample images of specific multiple determined pathological anomalies, the second group of sample images having a graphical indication of the location of a pathological anomaly in a respective image, wherein a plurality of the images of the representative second group of sample images are the same as a plurality of the first group of the sample images; and
a fourth portion of the summary graphic image including an undetected findings section comprising a textual listing of specific undetected pathological anomaly findings, wherein a specific undetected pathological anomaly is an evaluated pathological anomaly that is determined to be below a threshold value to be considered a detected pathological anomaly, and wherein a detection score value is displayed for a plurality of the specific undetected pathological anomaly findings; and creating a new version of a DICOM file, wherein the new version of the DICOM file comprises the generated summary graphic image.

16. The method of claim 15, further comprising:

receiving, via a proxy server, a DICOM file comprising the multiple CT images, wherein the server communicates, via a communications link, with a picture archiving and communication system (PACS), and wherein the DICOM file is obtained from the PACS;

assigning one or more unique identifiers in association with the received DICOM file;

extracting CT images from the received DICOM file and generate a data package of the extracted CT images and the one or more unique identifiers;

securely transmitting the data package to a remote server; and receiving from the remote server, the created new version of the DICOM file;

wherein the summary graphic image further comprises a header section describing a series identifier and a study identifier that are associated with the DICOM file obtained from the PACS.

17. The method of claim 16, wherein a plurality of the images include multiple graphical indications of pathological anomalies detected in an image.

18. The method of claim 17, wherein the summary graphic image comprises a listing of pathological anomalies that do not meet a threshold level of confidence.

19. The method of claim 18, wherein the summary graphic image comprises another portion indicating a pathology anomaly presence indication score, wherein the another portion includes a numeric value and a graphical indication of the pathology anomaly presence indication score.

20. The method of claim 19, wherein the summary graphic image comprises another portion including a QR code configured with email information for providing feedback from a reviewer of the summary graphic image.

21. The method of claim 20, wherein the first group of sample images and the second group of sample images are thumb-nail image representations of at least one of the multiple CT images.

22. The method of claim 21, wherein the first portion depicts one or more of the same sample images as depicted in the third portion.

23. The method of claim 21, wherein the thumb-nail image representations include a reference number of a position and total number of the multiple CT images.

24. The method of claim 21, wherein the thumb-nail image representations include an area of an image of the multiple CT images depicting a graphical indication of an area of a determined pathological.

25. The method of claim 15, wherein the third portion comprises:

a grid of multiple sample images depicting different determined pathological anomalies, wherein the grid includes rows of images, with a row having a different number of images than another row, where a row depicts images of a particular determined pathological anomaly.

26. The method of claim 15, further comprising the operations of:

selecting a group of multiple images representing different determined pathological anomalies; and adding the selected group of multiple images representing the different determined pathological anomalies to the first portion of the summary graphic image.

27. The method of claim 15, further comprising the operations of:

selecting a first group of multiple images representing a determined pathological anomaly;

adding the selected first group of multiple images representing the specific determined pathological anomaly to the third portion of the summary graphic image;

selecting a second group of multiple images representing an another determined pathological anomaly; and adding the selected second group of multiple images representing the another determined pathological anomaly to the third portion of the summary graphic image.

28. The method of claim 27, further comprising the operations of:

determining an order of presentation in the summary graphic image for an anomaly, based on a pre-assigned rank of a respective determined pathological anomaly.

* * * * *